US012211378B2

(12) United States Patent
Stewart (10) Patent No.: US 12,211,378 B2
(45) Date of Patent: Jan. 28, 2025

(54) VISUAL WARNING ASSEMBLY (71) Applicant: Platinum Attitude LLC, Birchwood, TN (US)

(72) Inventor: David Mark Stewart, Birchwood, TN (US)

(*) Notice: Subject to any disclaimer, the term of this patent is extended or adjusted under 35 U.S.C. 154(b) by 152 days.

(21) Appl. No.: 17/967,800

(22) Filed: Oct. 17, 2022

(65) Prior Publication Data

US 2023/0039600 A1 Feb. 9, 2023

Related U.S. Application Data (63) Continuation-in-part of application No. 17/165,709, filed on Feb. 2, 2021, now Pat. No. 11,472,431.

(60) Provisional application No. 62/984,216, filed on Mar. 2, 2020.

(51) Int. Cl.
| G08B 21/00 | (2006.01) |
| B62J 50/21 | (2020.01) |
| B62J 50/28 | (2020.01) |
| G08G 1/09 | (2006.01) |

(52) U.S. Cl.
CPC ............... G08G 1/09 (2013.01); B62J 50/21 (2020.02); B62J 50/28 (2020.02)

(58) Field of Classification Search
USPC .......... 340/425.5, 539.11, 539.16, 287, 517, 340/573.1, 573.4, 522, 330, 331, 565, 340/566, 567, 425
See application file for complete search history.

(56) References Cited

U.S. PATENT DOCUMENTS

| 6,147,608 | A | * | 11/2000 | Thacker | G08B 7/06 340/331 |
| 9,561,041 | B2 | * | 2/2017 | Snider | A61B 17/175 |
| 9,564,041 | B1 | * | 2/2017 | Dedeaux | G08B 25/009 |
| 2005/0043102 | A1 | * | 2/2005 | Anderson | A63F 9/24 463/49 |
| 2005/0162513 | A1 | * | 7/2005 | Chan | G07C 5/085 348/118 |
| 2011/0140913 | A1 | | 6/2011 | Montenero | |
| 2011/0169409 | A1 | * | 7/2011 | Stasky | B62J 6/027 315/77 |
| 2012/0235860 | A1 | * | 9/2012 | Ghazarian | G08B 21/0202 342/357.54 |

(Continued)

Primary Examiner — Daniel Previl
(74) Attorney, Agent, or Firm — Chambliss, Bahner & Stophel, P.C.; Drew M. Ellis (57) ABSTRACT A visual warning system for transmitting a signal from a first user to a second user. The system includes a first and second visual warning assembly. Each visual warning assembly includes a case having a base and a front face and an enclosed space within the case. Each visual warning assembly also includes an antenna and a lighted button configured to illuminate and de-illuminate. Finally, each visual warning assembly includes a microcontroller disposed within the enclosed space and electrically coupled together with the antenna and lighted button. The visual warning assembly can send and receive communications having instructions to and from other visual warning assemblies. As the lighted button of the first visual warning assembly is illuminated by a user, an instruction is sent to the second visual warning assembly illuminating the lighted button of the second visual warning assembly.

16 Claims, 5 Drawing Sheets

(56) References Cited

U.S. PATENT DOCUMENTS

2018/0151062 A1 5/2018 Takagi
2021/0183244 A1 6/2021 Malhan et al.

\* cited by examiner

VISUAL WARNING ASSEMBLY

CROSS-REFERENCE TO RELATED APPLICATIONS

This application is a Continuation-in-Part application to U.S. patent application Ser. No. 17/165,709 filed Feb. 2, 2021 entitled VISUAL WARNING SYSTEM, which claims the benefit of U.S. Provisional Application No. 62/984,216 filed Mar. 2, 2020. Each of the foregoing applications is incorporated herein by reference in its entirety.

FIELD

The present invention relates generally to a device for communicating with a similar device. More particularly, the invention system and device for transmitting signals from one device to another device, typically utilized by vehicles where verbal or other line-of-sight communication is difficult.

BACKGROUND

Prior to embodiments of the disclosed invention, it was difficult for vehicle operators to signal one another. Embodiments of the disclosed invention solve this problem.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value, which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by a visual warning system for transmitting a signal from a first user to a second user. The visual warning system may have a first visual warning assembly and a second visual warning assembly. Each visual warning assembly may include a case formed by a base and a front face. An enclosed space may be formed within the case. The visual warning assembly further contains an antenna, a lighted button disposed on the case and configured to illuminate and de-illuminate, and a microcontroller. The microcontroller may be disposed within the enclosed space, and may be electrically coupled together with the antenna and lighted button. The visual warning assembly is further configured to send and to receive communications having instructions to and from other visual warning assemblies. In response to the lighted button of the first visual warning assembly being illuminated by a first user, the first visual warning assembly sends a first instruction to the second visual warning assembly and the microcontroller of the second visual warning assembly automatically illuminates the lighted button of the second visual warning assembly.

Also disclosed is a method for transmitting a visual warning between a first user and second user. The method includes a step f providing a first visual warning assembly and a second visual warning assembly. Each visual warning assembly may have a case formed by a base and a front face, and an enclosed space formed within the case. The visual warning assemblies may also include an antenna, a lighted button disposed on the case and configured to illuminate and de-illuminate, and a microcontroller disposed within the enclosed space. The microcontroller is electrically coupled together with the antenna and the lighted button. The visual warning assembly may be configured to send and to receive communications having instructions to and from other visual warning assemblies. The method further includes the step of pressing the button of the first visual warning assembly, causing the button of the first visual warning assembly to illuminate, and the button of the second visual warning assembly to illuminate. The method finally includes the step of pressing the now-illuminated button of the second visual warning assembly, causing the illuminated button of the first visual warning assembly and the illuminated button of the second visual warning assembly to de-illuminate.

In addition to the above, a visual warning system for transmitting a signal from a first user to a second user is also disclosed. The visual warning system may comprise a first visual warning assembly and a second visual warning assembly. Each visual warning assembly may include a case formed by a base and a front face, an enclosed space formed within the case, an antenna, and a lighted button disposed on the case and configured to illuminate and de-illuminate to display a color. Each visual warning assembly may include a channel display button, a channel selector button, a power button, a rechargeable battery to power the respective visual warning assembly, and a charging port disposed on the case to facilitate charging of the rechargeable battery. Each visual warning assembly may further include an ambient light sensor disposed on the case, a connection status indicator light disposed on the case and configured to illuminate when the first visual warning assembly is in radio communication with the second visual warning assembly, and a microcontroller. The microcontroller may be disposed within the enclosed space and electrically coupled together with the antenna, the lighted button, the channel display, the channel selector, the power button, the battery, the ambient light sensor, and the connection status indicator light. Each visual warning assembly may also include a mount configured to mount the visual warning assembly to a handlebar of a motorcycle. Further, the visual warning assembly is configured to send and to receive communications to and from other visual warning assemblies.

The first user may initially provide power to the first visual warning assembly utilizing the power button of the first visual warning assembly and the second user may provide power to the second visual warning assembly utilizing the power button of the second visual warning assembly. The first user then selects a communication channel with the channel selector button of the first visual warning assembly. The second user then selects the same communication channel with the channel selector button of the second visual warning assembly, thereby establishing radio communication between the first visual warning assembly and the second visual warning assembly. The first user may then press the button of the first visual warning assembly, causing the button of the first visual warning assembly to illuminate and display the color. A first instruction is then transmitted from the first visual warning assembly to the second visual warning assembly, causing the button of the second visual warning assembly to illuminate and display the color. As the second user presses the illuminated button of the second visual warning assembly, a second instruction is transmitted to from the second visual warning assembly to the first visual warning assembly and the illuminated button of the first visual warning assembly and the illuminated button of the second visual warning assembly de-illuminate. Further, as the button of the first visual warning assembly is illuminated, the ambient light sensor of the first visual warning assembly detects a change in a light condition and changes a brightness level of the illuminated button of the first visual warning assembly. Finally, as the button of the second visual warning assembly is illuminated, the ambient light sensor of the second visual warning assembly detects a change in a light condition and changes a brightness level of the illuminated button of the second visual warning assembly.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

This description of the preferred embodiment of the invention is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness.

By way of example, and referring to FIGS. 1-9, a visual warning assembly 10 is configured to make a warning from one vehicle to another vehicle. The visual warning assembly 10 further comprises a case further comprising a front face 12a joined to a base 12b and an antenna 12c. An enclosed space 12d is formed within the case. In certain embodiments, the antenna 12c is contained within the enclosed space 12d. In certain embodiments, a mounting ball 18 is magnetically joined to the base 12b. Other mounting means are contemplated, i.e. clamps, X-mounts, Quad Locks, or other mounting systems known in the art. Antenna 12c can also be fully enclosed within the case. A channel display button 14a is arranged on the front face 12a. A channel selector button 14b is arranged on the front face 12a. A power button 14c is arranged on the front face 12a. In certain embodiments, the visual warning assembly may include an ambient light sensor, typically, but not necessarily located on the front face 12a. The ambient light sensor detects the amount of light present and accordingly adjusts the brightness of the various displays. The ambient light sensor is particularly useful if the visual warning assembly is being used in a low-light environment, i.e., at night or in a tunnel. A green-lighted button 16a is arranged on the front face 12a. A yellow-lighted button 16b is arranged on the front face 12a. A red-lighted button 16c is arranged on the front face 12a. In certain embodiments, lighted buttons featuring different or changeable colors are contemplated. In certain other embodiments, lighted buttons absent color are contemplated. In yet more embodiments, uniquely shaped (i.e., non-round) buttons are contemplated. In alternative embodiments, the channel display button 14a, channel selector button 14b, and power button 14c, are arranged in locations distinct from the front face 12a. These locations distinct from the front face 12a may be changed to conform to the preferences of the end user. Additionally, the green-lighted button 16a, yellow-lighted button 16b and red-lighted button 16c may be located in positions distinct from the front face depending on end user preferences. In certain other embodiments, the front face 12a includes a status light indicating the connectivity status to a second visual warning assembly 20b. In certain other embodiments, the status light is located in a location distinct from the front face 12a.

A microcontroller 22 is electrically coupled to the green-lighted button 16a, the yellow-lighted button 16b, and the red-lighted button 16c. The microcontroller 22 is programmed with instructions to receive a communication from a second visual warning assembly 20b. Then, illuminate one member of a typically non-illuminated lighted button set consisting of the red-lighted button 16c, the yellow-lighted button 16b, and the green-lighted button 16a, creating an illuminated indicating light. The illuminated button corresponds to the button selected on the second visual warning assembly. In certain embodiments, the illuminated button is continuously illuminated. In other embodiments, the illuminated button blinks. In yet further embodiments, the illuminated button either blinks or stays continuously illuminated depending on the signal received from the second visual warning assembly. Finally, the illuminated button is depressed on the first visual warning assembly resulting in a change in the illumination of the corresponding lighted button on the second visual warning assembly. The microcontroller is electrically coupled to a battery. The battery is preferably rechargeable and in certain embodiments, the visual warning system includes a charging port. In certain embodiments, the charging port is a USB-C port.

In certain embodiments, a mounting arm 19 further comprising a handlebar mount 19b joined to the mounting arm 19 with a first ball joint 19c. A case mount 19a is joined to a mounting ball with a second ball joint 19c. Other mounting arrangements are contemplated.

Figure 1:
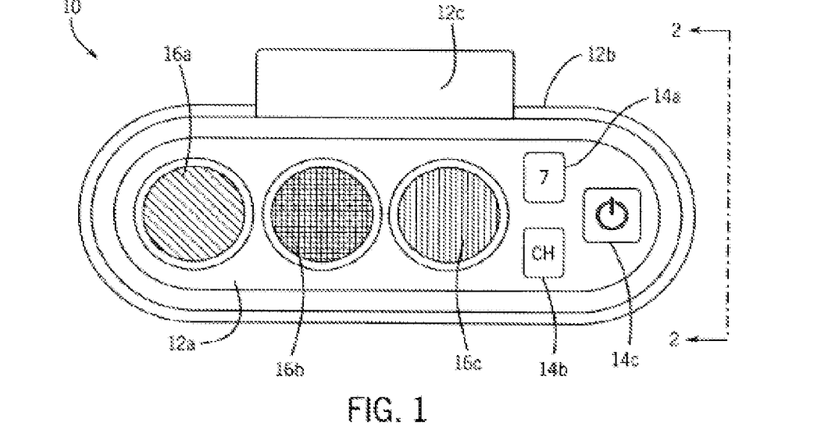
FIG. 1 depicts a front elevation view of a preferred embodiment of the invention.
Figure 2:
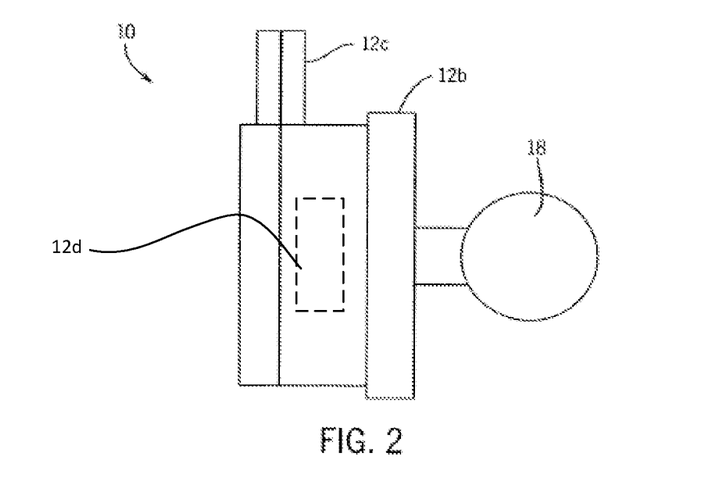
FIG. 2 is a side view of a preferred embodiment of the present invention.
Figure 3:
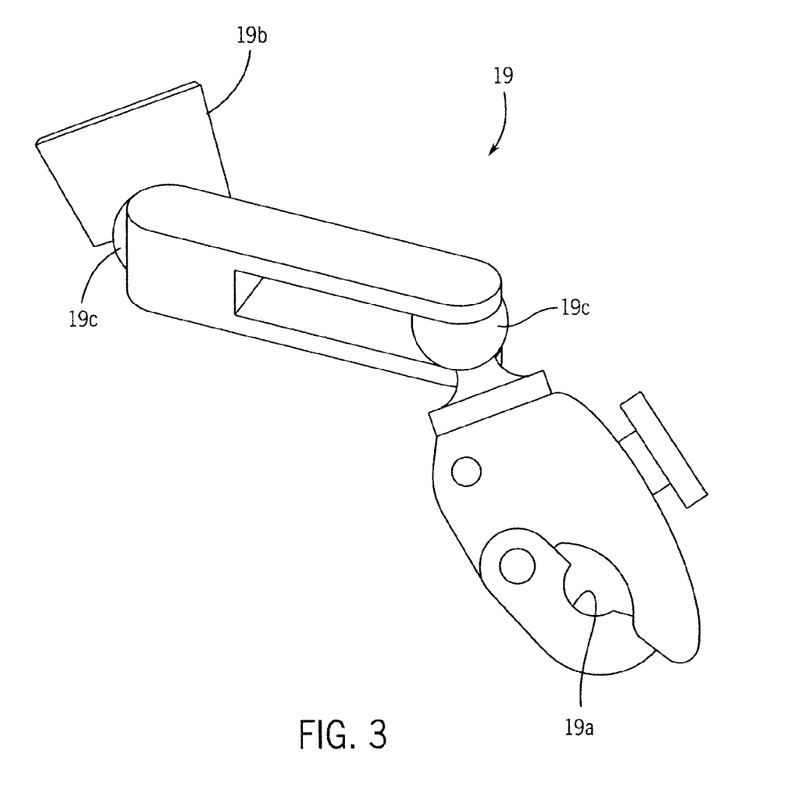
FIG. 3 is a is a perspective view according to an embodiment of the present invention.
Figure 4:
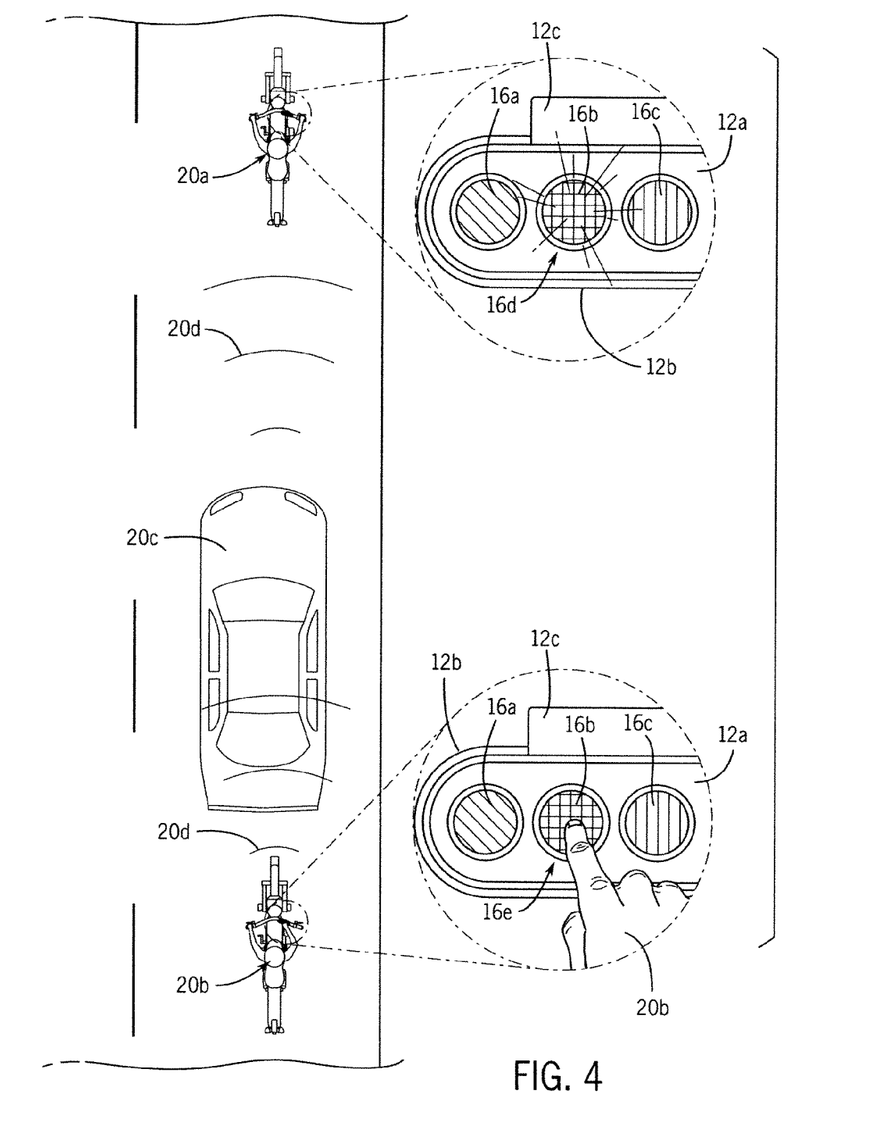
FIG. 4 is a schematic view according to one embodiment of the present invention.
Figure 5:
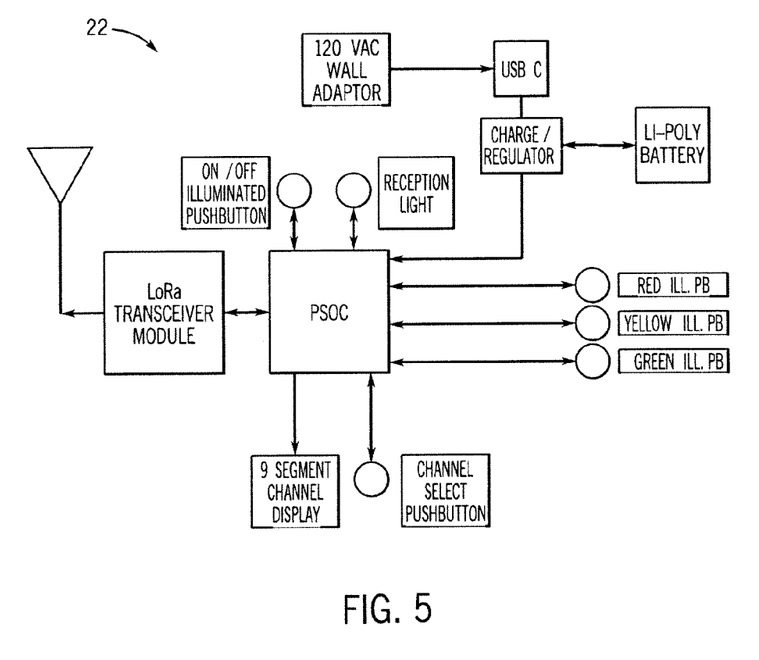
FIG. 5 is an alternative schematic view according to one embodiment of the present invention.
Figure 6:
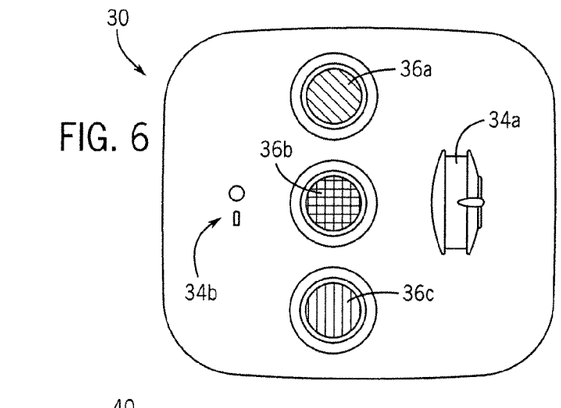
FIG. 6 is a front elevation view according to an embodiment of the present invention.
Figure 7:
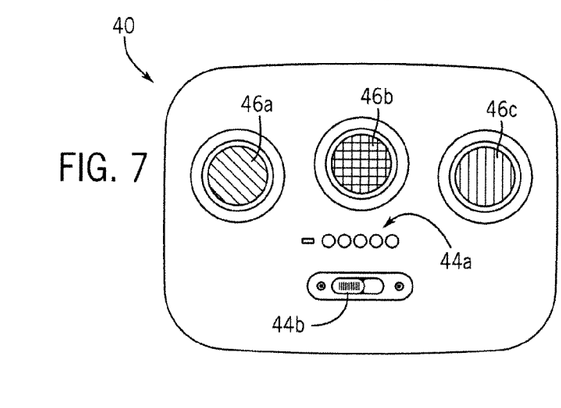
FIG. 7 is a front elevation view according to an alternate embodiment of the present invention.
Figure 8:
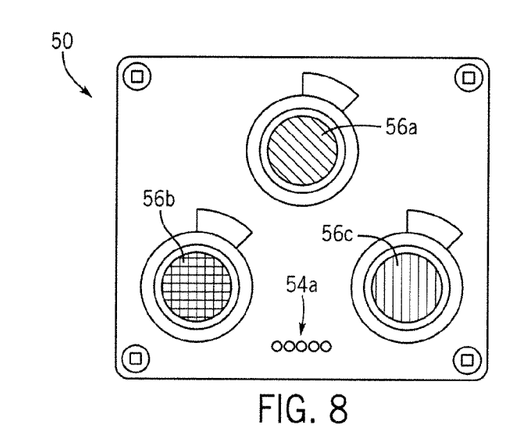
FIG. 8 is a front elevation view according to another alternate embodiment of the present invention.
Figure 9:
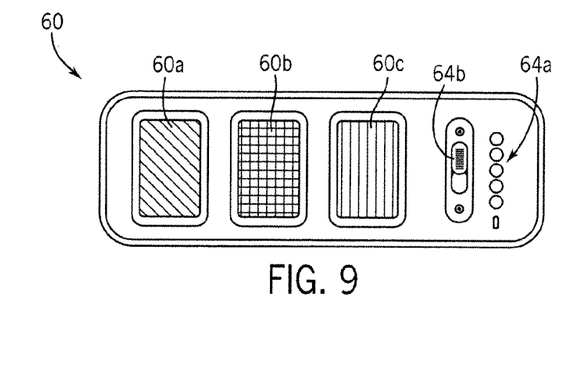
FIG. 9 is a front elevation view according to another alternate embodiment of the present invention.

As shown in FIG. 4, in operation, a first user 20a with a first visual warning assembly and a second user 20b with a second visual warning assembly are separated by an unaffiliated vehicle 20c. The second user 20b must communicate with the first user 20a to avoid becoming separated. The second user 20b depresses the presently non-illuminated yellow-colored button 16e. A signal 20d is sent from the second visual warning assembly to the first visual warning assembly. Upon receipt of the signal 20d, the corresponding yellow-colored button 16d illuminates on the first warning assembly. The first user 20a then depresses the now-illuminated yellow-colored button 16d, indicating receipt of the communication from the second user 20b. Upon depression of the yellow-colored button 16d on the first visual warning assembly, a signal 20d is sent to the second visual warning assembly causing a change in the illumination status of the yellow-colored button 16e. The first user 20a and the second user 20b, now having received each other's communications, respond appropriately to the situation.

Alternative embodiments are depicted in FIGS. 6-9. As shown, the microcontroller 22 is electrically coupled to the green lighted button 46a, 56a, 60a, the yellow lighted button 46b, 56b, 60b, the red lighted button 46c, 56c, 60c, a power indicator 34b, 44a, 54a, 64a, a power switch 44b, 64b. These can be in various configurations 40, 50, and 60.

A battery is electrically coupled to the microcontroller, and electrically coupled to a USB-C port in order to charge the battery. A power switch 44b, 64b is electrically coupled to the microcontroller 22. A power indicator 34b, 44a, 54a, 64a, is electrically coupled to the microcontroller 22. A low range radio transceiver module is electrically coupled to the microcontroller with a 9-channel selector 34a. In certain embodiments, the channel selector allows for more or less channels than nine.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A visual warning system for transmitting a signal from a first user to a second user, the visual warning system comprising:
    a first visual warning assembly and a second visual warning assembly, each visual warning assembly having:
        a case formed by a base and a front face;
        an enclosed space formed within the case;
        an antenna;
        a lighted button disposed on the case and configured to illuminate and de-illuminate; and
        a microcontroller disposed within the enclosed space and electrically coupled together with the antenna and the lighted button,
    wherein the visual warning assembly is configured to send and to receive communications having instructions to and from other visual warning assemblies,
    wherein, in response to the lighted button of the first visual warning assembly being illuminated by the first user, the first visual warning assembly sends a first instruction to the second visual warning assembly and the microcontroller of the second visual warning assembly automatically illuminates the lighted button of the second visual warning assembly.

2. The visual warning system of claim 1 wherein, in response to the lighted button of the second visual warning assembly being de-illuminated by the second user, the second visual warning assembly sends a second instruction to the first visual warning assembly and the microcontroller of the first visual warning assembly automatically de-illuminates the lighted button of the first visual warning assembly.

3. The visual warning system of claim 1 wherein each visual warning assembly further comprises a battery that is electrically coupled to the microcontroller.

4. The visual warning system of claim 3 wherein the battery of each visual warning assembly is rechargeable and each visual warning assembly further comprises a charging port disposed on the case and configured to receive a charging cable for recharging the battery.

5. The visual warning system of claim 1 wherein each visual warning assembly further comprises an ambient light sensor that is disposed on the case and that is electrically coupled to the microcontroller, and wherein the ambient light sensor is configured to detect changes in an ambient light condition and, in response to the ambient light sensor detecting a change in the ambient light condition, the microcontroller modifies a brightness level of the lighted button.

6. The visual warning system of claim 1 wherein each visual warning assembly further comprises an X-mount configured to mount the visual warning assembly to a vehicle.

7. The visual warning system of claim 1 wherein each visual warning assembly further comprises a magnetic mount configured to mount the visual warning assembly to a vehicle.

8. The visual warning system of claim 1 wherein each of the visual warning assemblies comprises a mount configured to attach to a handlebar of a motorcycle.

9. The visual warning system of claim 1 further comprising a status light disposed on the case of the first visual warning assembly; and
    a status light disposed on the case of the second visual warning assembly;
    wherein the status light of the first visual warning assembly illuminates and the status light of the second visual warning assembly illuminates when the first visual warning assembly and the second visual warning assembly are in radio communication; and
    wherein the status light of the first visual warning assembly ceases illumination and the status light of the second visual warning ceases illumination when the first visual warning assembly and the second visual warning assembly are not in radio communication.

10. The visual warning system of claim 1 wherein the lighted button of each visual warning assembly comprises at least two lighted buttons.

11. The visual warning system of claim 10 wherein a first one of the at least two lighted buttons is configured to display a first color when illuminated and wherein a second one of the at least two lighted buttons is configured to display a second and different color when illuminated.

12. The visual warning system of claim 10 wherein each of the at least two lighted buttons is configured to display one of a plurality of user-selected colors when illuminated.

13. The visual warning system of claim 1 wherein each visual warning assembly further comprises:
   a channel display button for displaying a current operating channel of the visual warning assembly; and
   a channel selector button for selecting one of a plurality of operating channels.

14. The visual warning system of claim 1 wherein each visual warning assembly further comprises a power button for activating and de-activating the visual warning assembly.

15. A method for transmitting a visual warning between a first user and a second user, the method comprising:
   providing a first visual warning assembly and a second visual warning assembly, each visual warning assembly having:
      a case formed by a base and a front face;
      an enclosed space formed within the case;
      an antenna;
      a lighted button disposed on the case and configured to illuminate and de-illuminate; and
      a microcontroller disposed within the enclosed space and electrically coupled together with the antenna and lighted button,
      wherein the visual warning assembly is configured to send and to receive communications having instructions to and from other visual warning assemblies,
   pressing the button of the first visual warning assembly, causing the button of the first visual warning assembly to illuminate, and the button of the second visual warning assembly to illuminate; and
   pressing the illuminated button of the second visual warning assembly, causing de-illumination of the illuminated button of the first visual warning assembly and the illuminated button of the second visual warning assembly.

16. A visual warning system for transmitting a signal from a first user to a second user, the visual warning system comprising:
   a first visual warning assembly and a second visual warning assembly, each visual warning assembly having:
      a case formed by a base and a front face;
      an enclosed space formed within the case;
      an antenna;
      a lighted button disposed on the case and configured to illuminate and de-illuminate;
      a channel display button;
      a channel selector button;
      a power button;
      a rechargeable battery to power the respective visual warning assembly;
      a charging port disposed on the case to facilitate charging of the rechargeable battery;
      an ambient light sensor disposed on the case;
      a status light disposed on the case configured to illuminate when the first visual warning assembly is in radio communication with the second visual warning assembly;
      a microcontroller disposed within the enclosed space and electrically coupled together with the antenna, the lighted button, the channel display, the channel selector, the power button, the battery, the ambient light sensor, and the connection status indicator light; and
      a mount configured to mount the first visual warning assembly to a handlebar of a motorcycle,
   wherein the visual warning assembly is configured to send and to receive communications having instructions to and from other visual warning assemblies;
   wherein the first user provides power to the first visual warning assembly utilizing the power button of the first visual warning assembly and the second user provides power to the second visual warning assembly utilizing the power button of the second visual warning assembly;
   wherein the first user selects a communication channel with the channel selector button of the first visual warning assembly;
   wherein the second user selects the communication channel with the channel selector button of the second visual warning assembly, establishing radio communication between the first visual warning assembly and the second visual warning assembly;
   wherein the first user presses the button of the first visual warning assembly causing the button of the first visual warning assembly to illuminate, a first instruction be sent from the first visual warning assembly to the second visual warning assembly, and the button of the second visual warning assembly to illuminate;
   wherein the second user presses the illuminated button of the second visual warning assembly the illuminated button of the first visual warning assembly and the illuminated button of the second visual warning assembly de-illuminated;
   wherein as the button of the first visual warning assembly is illuminated, the ambient light sensor of the first visual warning assembly detects a change in a light condition and changes a brightness level of the illuminated button of the first visual warning assembly; and
   wherein as the button of the second visual warning assembly is illuminated, the ambient light sensor of the second visual warning assembly detects a change in a light condition and changes a brightness level of the illuminated button of the second visual warning assembly.

* * * * *